Figure 10:
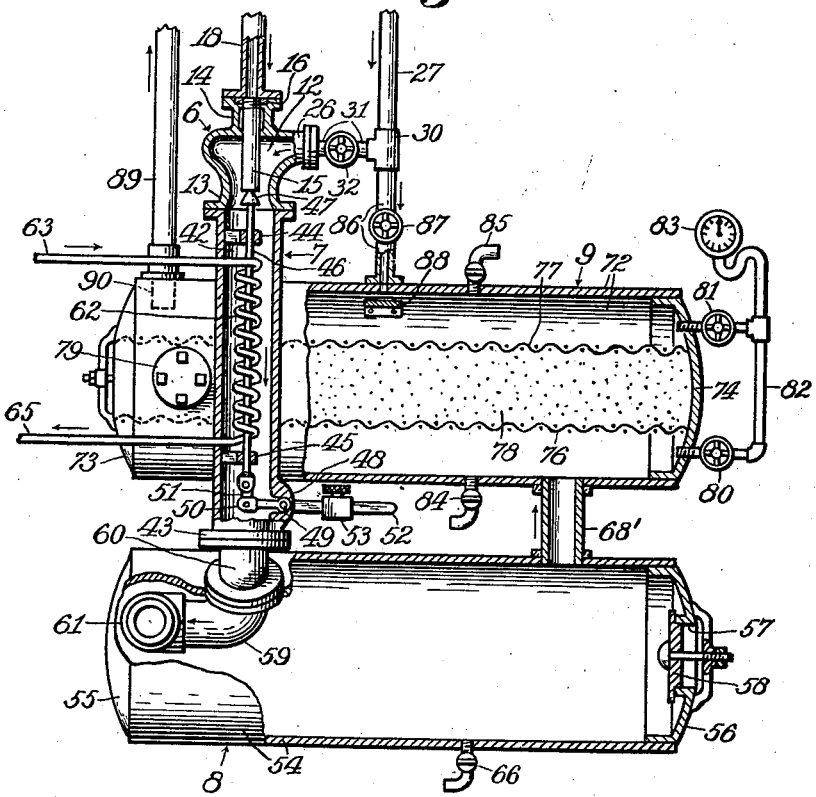

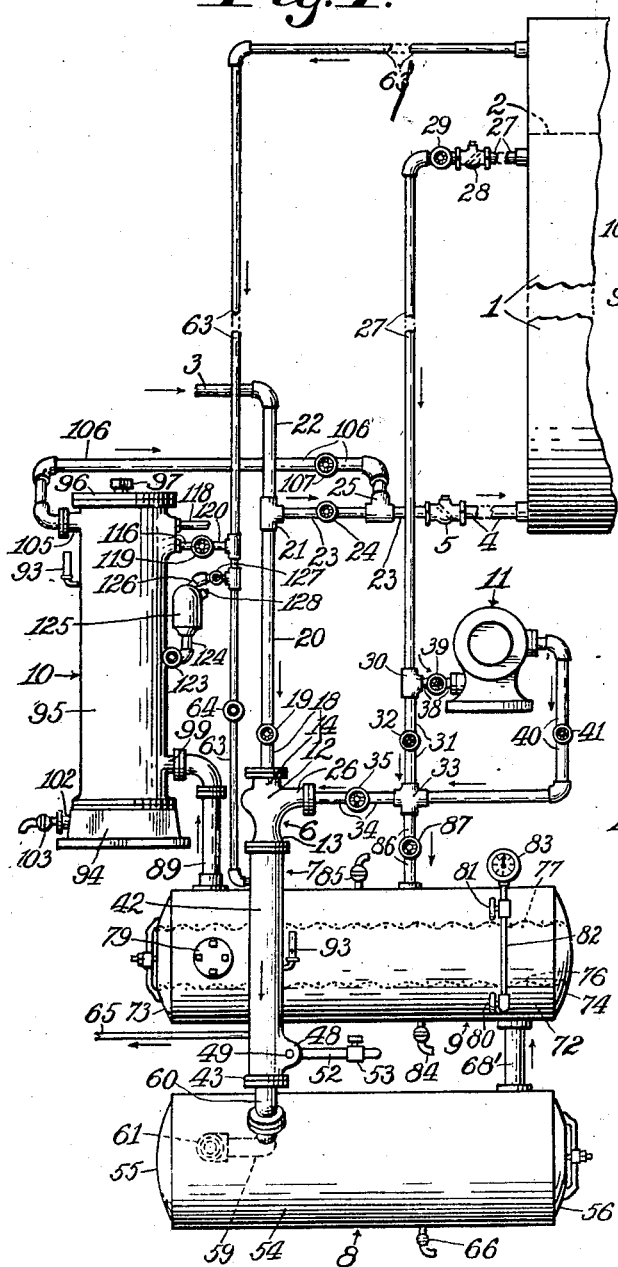

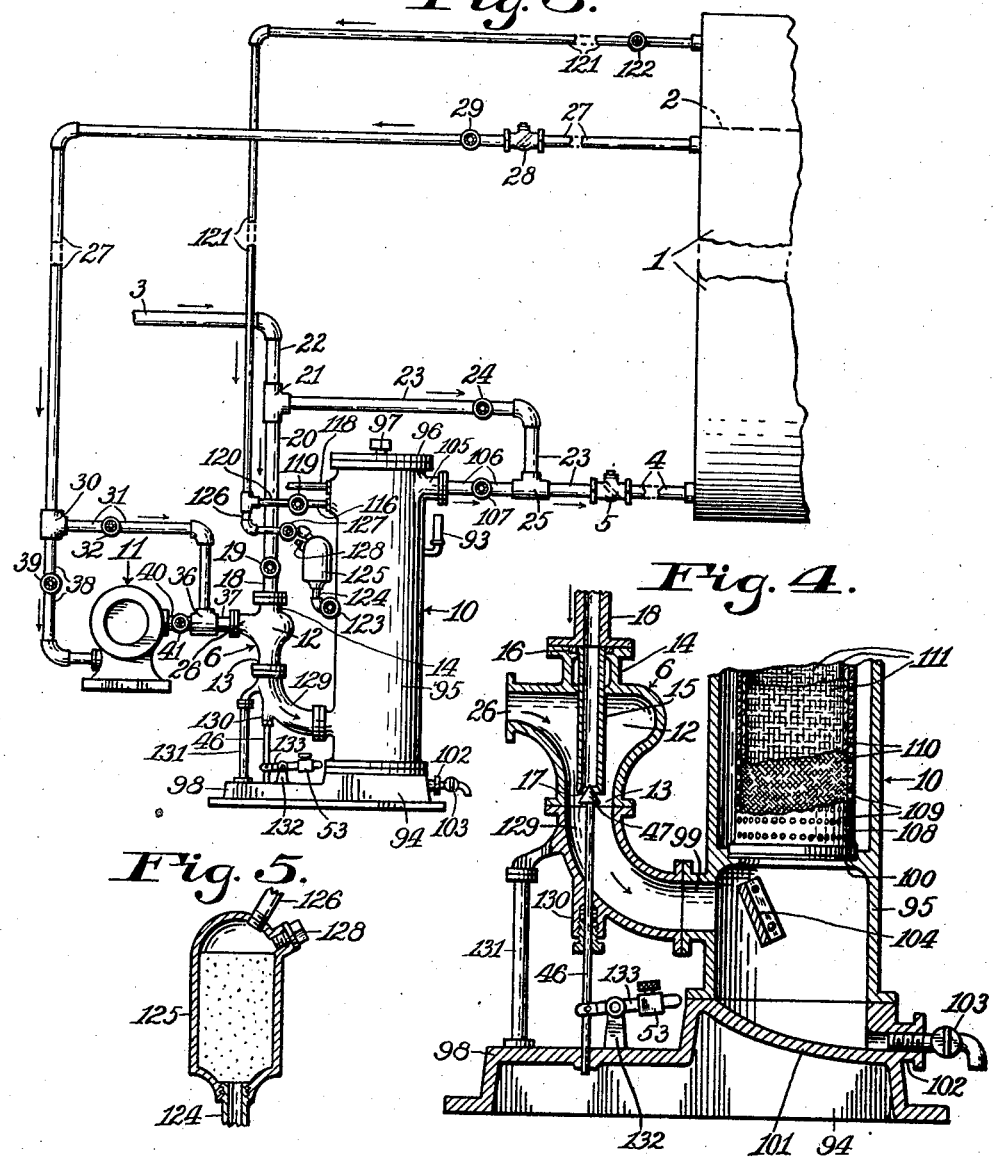

Feb. 19, 1924.
B. L. MORRISON
BOILER FEED WATER PURIFIER
Filed June 17, 1920    5 Sheets-Sheet 3
1,484,073
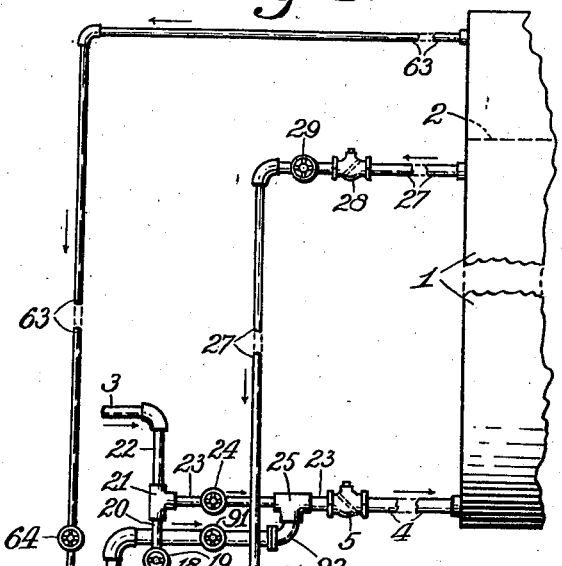
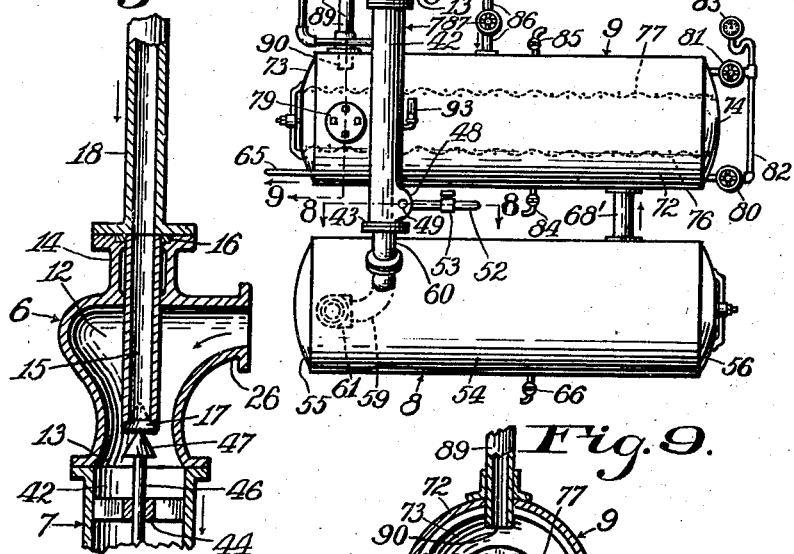
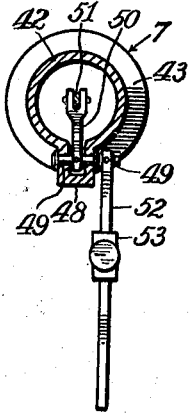
WITNESS:
Ed J. Clark.
G. L. Smith.
INVENTOR:
Budd L. Morrison,
BY E. D. Silvius.
ATTORNEY.

Feb. 19, 1924.

B. L. MORRISON 1,484,073

BOILER FEED WATER PURIFIER

Filed June 17, 1920

5 Sheets-Sheet 4

WITNESS:
Ed J. Clark.
G. L. Smith.

INVENTOR:
Budd L. Morrison,
BY
E. T. Silvius,
ATTORNEY.

Feb. 19, 1924.
B. L. MORRISON
1,484,073
BOILER FEED WATER PURIFIER
Filed June 17, 1920
5 Sheets-Sheet 5
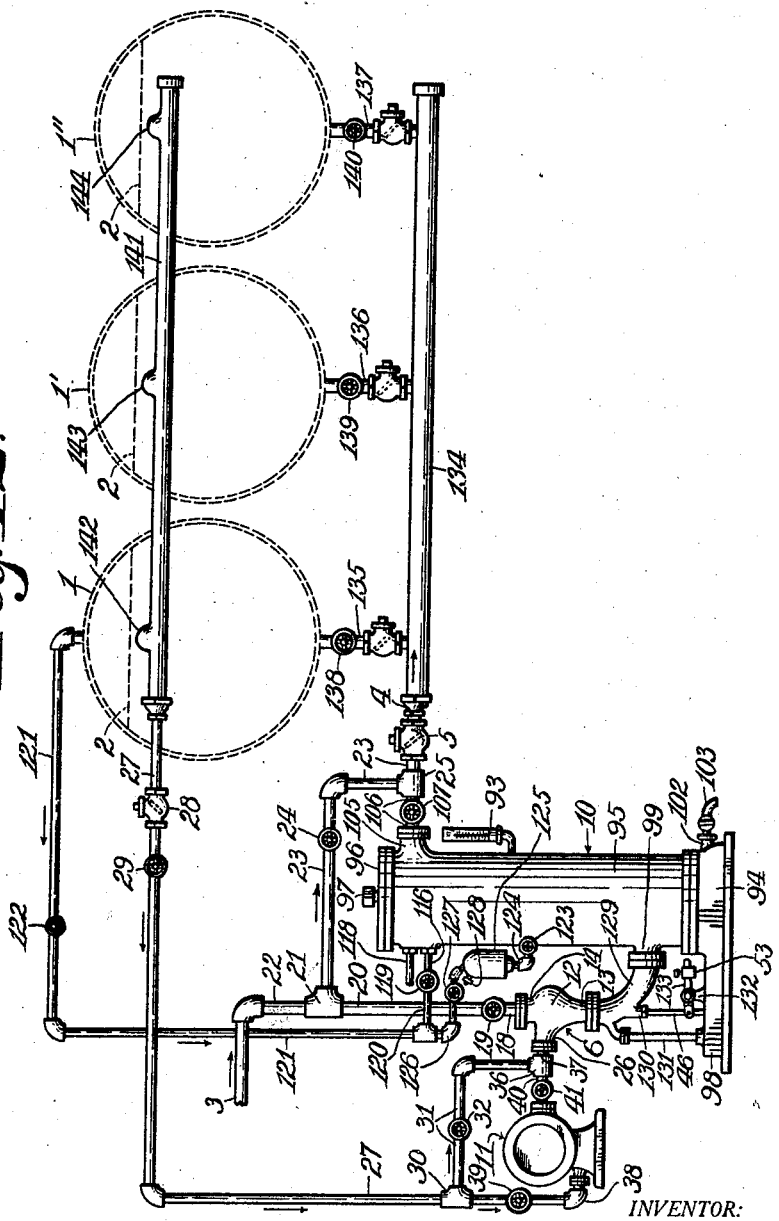
WITNESS:
Ed J. Clark.
G. L. Smith.
INVENTOR:
Budd L. Morrison,
BY
E. T. Silvius,
ATTORNEY.

Patented Feb. 19, 1924.

1,484,073

UNITED STATES PATENT OFFICE.

BUDD L. MORRISON, OF INDIANAPOLIS, INDIANA.

BOILER-FEED-WATER PURIFIER.

Application filed June 17, 1920. Serial No. 389,560.

*To all whom it may concern:*

Be it known that I, BUDD L. MORRISON, citizen of the United States, residing at Indianapolis, in the county of Marion and State of Indiana, have invented a new and useful Boiler-Feed-Water Purifier, of which the following is a specification, reference being had to the accompanying drawings and to the letters and figures of reference marked thereon.

The invention relates to a system of purifying or clarifying water while being fed to steam-boilers, the invention having reference more particularly to means whereby water containing matter that may be injurious to boilers, or unsuitable to be converted into steam with the best results, may be purified or rendered unobjectionable for use in boilers.

An object of the invention is to provide an improved system of purifying boiler feed-water which shall be so designed as to be capable of various modifications to adapt it to different boiler plants and to different conditions or qualities of feed-water.

Another object is to provide improved means whereby to separate lime, mud-forming substances or other substances from water to prevent formation of scale or deposits in steam-boilers.

A further object is to provide improved apparatus for purifying boiler feed-water, which shall be so constructed as to combine a number of advantageously connected units for purifying the most objectionable water and permitting modification in which one or more units may be advantageously used for purifying less objectionable water.

A still further object is to provide improved means for purifying boiler feed-water which shall be of such construction as to insure thorough separation of objectionable matter from the feed-water and permit the objectionable matter to be discharged so as to not accumulate or rapidly accumulate in the apparatus, which apparatus shall be so constructed as to permit sedimentary matter to be readily eliminated therefrom; an aim being to insure economy in the practice of purifying feed-water and in the generation of steam with a saving of fuel required for operation of steam-boilers and water heating plants.

With the above mentioned and other objects in view, the invention consists in an improved system and apparatus for purifying or clarifying boiler feed-water, which contemplates the application of heated water to assist in effecting purification of feed-water; and, the invention consists also further in the novel features or parts and in the combinations and arrangements of parts, as hereinafter particularly described and further defined in the claims appended hereto.

Figure 11:
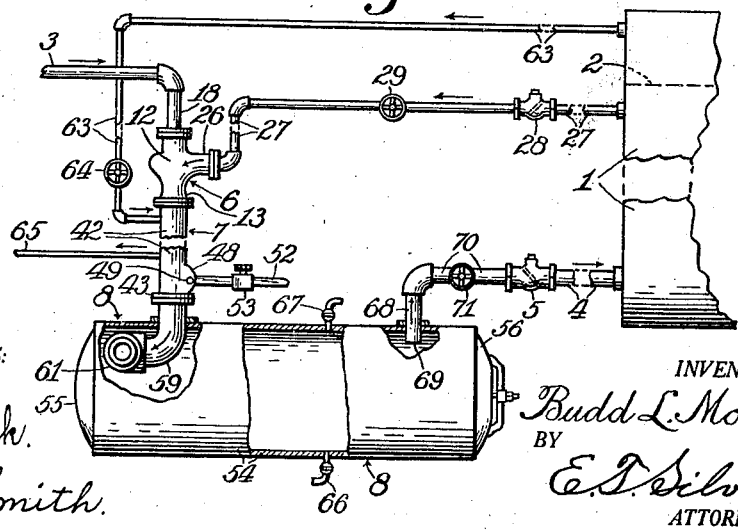

Referring to the drawings, Figure 1 is a diagrammatical elevation of the feed-water purifier in its complete form for treating the most objectionable or foul water, especially when a battery or plurality of boilers are to be supplied with water. Fig. 2 is a vertical central section of one of the units of the improved system which is capable of being used alone when the water is not exceedingly bad, being suitable to supply a single boiler. Fig. 3 is a diagrammatical elevation showing the improved system modified to adapt the unit shown in Fig. 2 to be used alone. Fig. 4 is a fragmentary sectional elevation showing the details of the modification illustrated in the preceding figure. Fig. 5 is a vertical section of a device whereby to introduce a cleansing or dissolvent solution into the purifying system. Fig. 6 is a diagrammatical elevation of the purifying system slightly modified so as to combine less than the whole number of units which may be used in case the water is of fair quality. Fig. 7 is a longitudinal central section on a large scale showing a portion of one of the principal elements of the system. Fig. 8 is a section on a large scale, approximately on the line 8—8 in Figure 6. Fig. 9 is a section on a large scale on the line 9—9 in Figure 6. Fig. 10 is a sectional elevation showing the detail of the construction and arrangement of a number of the units of the purifying system. Fig. 11 is a diagrammatical elevation showing the purifying system in modified form to be used under favorable conditions to purify fairly good water. Fig. 12 is a diagrammatical elevation showing the system in a simplified form and especially adapted for purifying the feed-water for a plurality of boilers.

Similar reference characters in the different figures of the drawings indicate corresponding elements or features of construction herein referred to in detail, and darts or arrows adjacent to pipe lines or vessels indicate the direction of flow of water or steam therethrough.

In the drawings the numeral 1 indicates a steam-boiler of any suitable construction and 2 is the water-level therein. The numeral 3 indicates a feed-pipe to be supplied by any suitable means, as a pump or an injector; and 4 indicates the delivery or terminal end of the feed line which may be connected in any suitable manner with a boiler or boilers, and is customarily provided with a check-valve 5 to prevent backflow of the feed-water. The complete purifying system contemplates the use of a circulation conduit which includes a water-combiner 6, a precipitating-tube 7, a settling-tank 8, a water-filterer 9 and a separator and strainer 10, through which the feed-water shall pass to be purified on its way from the feed-pipe to the boiler or boilers, a lesser number of the units mentioned being permissible when deemed sufficient under existing circumstance or conditions. In some cases, especially when several boilers are to be fed, a pump 11 is used in the system to insure circulation of the water and may in some cases constitute an element of the purifying system when one or two boilers are fed. The proper conduits and valves will be supplied in the purifying system as may be required.

The water-combiner 6 comprises a hollow main portion 12 having a flaring discharge neck or end 13 on one portion and an inlet neck 14 on the opposite portion thereof. A controller tube 15 is secured in the neck 14, preferably by means of a collar 16 thereon removably seated in the neck, and the tube extends through the interior of the portion 12 and into the smaller portion from where the discharge end 13 flares. The end of the tube 15 has a beveled inner portion 17 adapted to constitute a valve seat. A pipe section 18 is connected with the neck 14 and has a valve 19 connected therewith to which a pipe section 20 is connected, the latter preferably having a T 21 connected thereto which is connected with a pipe section 22 having connection with the feed-pipe 3, so that the water may be fed directly to the combiner; and preferably a pipe section 23 having a valve 24 connected therewith is connected with the T 21 and with the check valve 5, the pipe section 23 preferably having a T 25 connected therewith. The body portion of the combiner has a lateral circulation inlet neck 26 to receive hot water while the feed-water enters through the tube 15. A suitable pipe line is provided for conducting hot water to the combiner and preferably comprises a pipe section 27 having a check-valve 28 and a stop-valve 29 connected therewith, the line being connected with the boiler a suitable distance below the water-level therein. Preferably a T 30 is connected with the section 27 and has a pipe section 31 connected therewith, the section 31 being provided with a valve 32 and being connected with a suitable pipe fitting, as a cross 33, and to complete a line, a pipe section 34 provided with a valve 35 is connected with the cross and also with the inlet 26; or in some cases as seen in Figs. 3 and 12 the pipe section 31 has a T 36 connected therewith to which a pipe section or nipple 37 is connected which in turn is connected with the inlet 26 of the combiner. In other cases as shown in Fig. 11 the pipe line section 27 is connected directly with the inlet 26. When it is desired or necessary to use a hot-water pump 11, symbolically shown in the drawings, a pipe section 38 provided with a valve 39 is connected to the T 30 and with the intake of the water end of the pump, and a pipe section 40 provided with a valve 41 is connected with the water-outlet of the pump and with the cross 33, so as to have communication with the water-combiner; or in other cases as shown in Figs. 3 and 12 the pipe section 40 is connected with the pump and T 36 so as to have communication through the pipe section 37 with the water-combiner or purifying system to insure circulation of water under all circumstances from the boiler and through the purifying system back to the boiler or boilers.

The precipitating-tube 7 comprises a hollow main portion 42 adapted to form a chamber and preferably is cylindrical and arranged vertically, the upper end thereof being connected to the discharge end 13 of the water-combiner, the lower end thereof being provided with a joint flange 43. The interior of the body portion 42 is provided with guides 44 and 45 in which a controlling rod 46 is movably guided, and the upper end of the rod has a conical device 47 thereon which is adapted to be seated on the beveled edge 17 of the tube 15 and operate as a valve to close the tube, or to be adjusted to cause water from the tube to be spread out more or less thinly towards the flaring portion of the discharge neck in order to produce a partial vacuum to induce the flow of hot water through the inlet 26 and to regulate and assist in combining the hot water with the feed-water. The body portion 42 has a journal box 48 adjacent to the lower end thereof and it has a rock-shaft 49 therein and extending therefrom, and an arm 50 is secured to the rock-shaft and extends into the chamber and is connected with the rod 46, preferably by means of a link 51. A lever arm 52 is secured to the outer portion of the rock-shaft and has a weight 53 adjustable thereon, to counterbalance the connections and tend to move the device 47 up to the tube 15.

The settling-tank 8 comprises a hollow cylinder 54 having heads 55 and 56, one of the heads having a man-hole 57 provided with a closure 58. An elbow 59 is suitably secured at one end to the cylinder 54 and by means of a fitting 60 to the lower end of the body part 42, and it extends in the cylinder towards one of its heads so that the head may serve as a deflector, but preferably the end of the elbow has a pipe T 61 connected thereto so as to provide two outlets in opposite directions from the elbow, to cause a relatively slow flow of the feed-water into the settling-tank and permit the separation of sedimentary matter from the water before the water passes onward to the boiler. In order to insure thorough separation and precipitation of the solids from the water a heating coil 62 composed of suitable piping is arranged in the body portion 42 to constitute an element of the precipitating tube, and a steam-pipe 63 is connected with the upper end of the coil and also with the boiler 1, or with one of a number of boilers at a point to receive steam therefrom and preferably being provided with a valve 64. An outlet pipe 65 is connected with the lower end of the coil and may be extended to any desired point. The cylinder 54 has a blow-off cock 66 connected thereto, preferably at the lowest point thereof, and in some cases as when the settling-tank is used without other units of the system, a blow-off valve 67 is connected with the upper portion thereof for the discharge of foamy water or scum. A discharge pipe 68 is connected to the upper portion of the cylinder 54 and has an inlet portion 69 extending downward from the cylinder wall so as to receive solid water clear of impurities. In case the settling-tank is installed with the water-filterer, a connecting pipe 68' is substituted for the discharge pipe 68. When the settling-tank is to deliver directly to the boiler a pipe section 70 provided with a valve 71 is connected with the discharge pipe 68 and with the check valve 5, as in Fig. 11.

The water-filterer included in the purifying system comprises a hollow cylinder or shell 72 having heads 73 and 74, one of the heads being provided with a man-hole cover 75. A filtering-bed is horizontally arranged in the cylinder and preferably comprises a screen 76 arranged in the lower portion of the cylinder and another screen 77 arranged in the upper portion of the cylinder, and suitable filtering substance 78 between the screens. The cylinder is provided with a hand-hole 79 which should be arranged to permit access to the filtering substance and to permit the latter to be placed in position. The cylinder 72 is connected to the pipe section 68' and preferably is arranged higher than the settling-tank. The water-filterer is provided with a pressure gage which may be shut off from operation by means of a valve 80 connected to the lower portion of the cylinder or one of its heads and another valve 81 similarly connected above the filter-bed, a pipe 82 being connected with the two valves and also to a pressure gage 83 so that in case the filtering-bed becomes clogged the fact can be discovered by testing the pressure above and below it. The lower portion of cylinder 72 has a sludge discharge cock 84, and the upper portion of the cylinder has a blow-off cock 85 connected thereto so that scum may be readily disposed of. A branch pipe 86 provided with a valve 87 is connected with the T 30 when present or with the cross 33 if present in the system, and the branch is connected also to the cylinder 72 to permit hot water from the boiler to be used for washing out the water-filterer. A baffle plate 88 is secured to the inside of the cylinder 72 opposite to the terminal end of the branch pipe 86 to prevent the incoming stream of water from cutting away the screen 77. A discharge pipe 89 is connected to the upper portion of the cylinder 72 and has an inlet portion 90 which extends downward so as to receive solid water free from scum. When the separator and strainer is not included in the purifier system the pipe 89 has a valve 91 connected therewith to which a pipe section 92 is connected which in turn is connected with the pipe T 25 through which to conduct the feed-water to the boiler or boilers. Preferably a thermometer 93 is connected with the water circulating system, and may suitably be connected with the cylinder 42 or wall of the precipitating-tube.

The separator and strainer 10 comprises a base portion 94 which may be a separate part, a hollow cylinder 95 connected at one end to the base or base portion, and a head or cover 96 connected to the opposite end thereof. A securing screw 97 is inserted in the head 96 and extends into the hollow cylinder. In some cases the base 94 has a horizontal extension 98 thereon. The cylinder 95 has an inlet neck 99 at a suitable distance from the base portion, and the inner side of the cylinder has an annular ledge 100 which is arranged on a plane above the inlet neck, so that a settling-chamber is provided below the ledge, the chamber having a bottom 101 which is a portion of the base 94, the base having a sludge discharge neck 102 provided with a discharge cock 103. When the separator and strainer is associated with the water-filterer the inlet neck 99 is connected with the discharge pipe 89, the latter in such case not being directly connected with the pipe T 25. Preferably a baffle plate 104 is secured to the inside of the cylinder 95 opposite to the inlet 99 to spread out the streams entering the settling-chamber, so as to facilitate separation of solids from the water before the water passes the ledge. The cylinder 95 has an outlet neck 105 adjacent to the head 96, and a discharge pipe 106 provided with a valve 107 is connected with the outlet neck and also with the T 25. A strainer is provided which comprises a tube 108 that has one end seated upon the ledge 100 and has perforations 109 therein, and a tubular strainer 110 inserted into the tube and preferably composed of woven fabric to strain the passing water, and the strainer is held in place by means of a tube-shaped screen 111 inserted in the strainer and secured in place by means of split elastic rings 112 and 113 inserted therein adjacent to the ends of the tube 108, permitting the strainer devices to be readily removed to be cleansed or renewed. The tube 108 has a cover or cap 114 secured to its upper end by means of the screw 97, so that water entering the tube must pass out through the strainer and the perforations 109 and the space between the tube and the wall of the cylinder 95, and thence to the outlet neck. In order to cause precipitation of solids from the feed-water, a pipe coil 115 is arranged inside the strainer and has a steam-pipe 116 connected with its upper end and extending through the cover 114 and the wall of the cylinder 95. A return pipe 117 is arranged within the pipe coil and connected with the lower end thereof, extending thence upward through the cover 114 and being connected with a discharge pipe 118 extending through the wall of the cylinder 95. A valve 119 is connected with the steam-pipe 116 and a pipe section 120 is connected with the valve and also with the steam-pipe 63, or in a modified arrangement with a similar steam-pipe 121 having a valve 122 and connected with a steam space in the boiler or one of the boilers of a battery thereof.

Preferably a valve 123 is secured in the wall of the cylinder 95 and has a pipe section 124 connected thereto; a vessel or receptacle 125 is connected with the pipe section and has a steam-pipe 126 connected thereto which is connected with the steam pipe 63 or a similar steam-pipe 121, the steam-pipe 126 being provided with a valve 127. The vessel is provided with a filling plug 128, so that any desired beneficial solution may be inserted into the vessel to be fed into the cylinder 95 to clean the strainer, or to the feed-water, or into the circulation conduit, as an aid to the removal of scale or deposits.

In case the feed-water is fairly good the separator and strainer unit may be used with good results without other units of the purifying system, and in such case a curved precipitating-tube 129 is connected to the discharge end 13 of the combiner 6 and to the inlet neck 99 of the separator and strainer unit, and the tube is provided with a packing box 130 through which the controlling rod 46 is extended, and the conical device 47 is arranged as above described with respect to the controller tube 15. Preferably the precipitating-tube 129 is provided with a prop 131 supported upon base extension 98. The base extension supports a pivot stand 132 on which a lever 133 is pivoted between its ends and connected at one end with the rod 46, the opposite portion of the lever having the weight 53 adjustable thereon to counterbalance the connections and variably counteract the force of the feed-water passing from the tube 15 against the conical controller device 47. The thermometer 93 may be usefully connected to the wall of the cylinder 95 for ascertaining the temperature of the feed-water.

An example of a useful arrangement of the purifying system with a plurality of boilers is made more clear with reference to Fig. 12 in which three boilers, 1, 1', and 1", are symbolically shown by broken lines without reference to any specific type of boiler or arrangement of the boilers; a header 134 is connected with the terminal portion 4 of the feed line, and branches 135, 136 and 137 are connected with the header and also are properly connected with the boilers respectively and provided with valves 138, 139 and 140 respectively. Another header 141 is suitably arranged and connected with the pipe section 27 or similar hot-water pipe, and the header has branches 142, 143 and 144 properly designed and connected with the boilers respectively below the water level in the boilers.

When a plurality of boilers are fed by one boiler feeder the boilers may not operate uniformly, one or more of the boilers being furnished with a greater degree of heat than others so that it or they generate more steam and require more water than the others, and accordingly the water supply is regulated for each boiler individually. Under such circumstances inequality of pressure may result in sluggish or slow circulation through the purifying system, and make it desirable or necessary to use the hot-water force pump to insure circulation of water, so that clear hot-water from the upper portions of the boilers shall be obtained to mix with the incoming and impure feed-water to assist in purifying the latter.

In practical use the feed-water is forced through the feed-pipe 3 and into the combiner 6 which preferably is included in each purifying system. As the water flows from the controller tube 15 it flows over the surface of the conical controller device 47 more or less thinly, and is deflected towards or to the wall of the flaring discharge end 13, so as to tend to create a partial vacuum in the upper portion of the chamber 12 whereby flow of the hot water into the inlet 26 is induced, the hot water and the feed-water becoming combined to subsequently flow through the precipitating tube, where precipitation of solids may be aided by steam in the heating coil 62. When the water is fed in large volume the large flow and pressure forces the device 47 downward against the pressure of the weight 53, which may be adjusted to regulate the induction of the hot water, the weight causing the conical device to more nearly close the orifice of the tube 15 when the feed is slower. In case of an accidental break in the feed-line or stoppage of the feed-pump, the weight 53 overbalances the lever and connections, and causes the conical device to rise and act as a valve and close the orifice of the tube 15 and prevent flow of the hot water out through the tube. The combined water flows onward and is purified on its way to the boiler or boilers by means of the various units of the purifying system which may be present in any particular purifying plant. As the water enters the settling-tank 8 the flow becomes relatively slow on entering the tank from the elbow 59, so that the solids may settle from the water before the latter flows onward from the tank. When the water flows into the water-filterer it encounters the filter bed therein and must pass through it and become purified or measurably so. In case the water is not entirely clear it becomes more so or perfectly clear in passing through the separator and strainer from whence the water is forced onward to the boiler or boilers. Some of the water fed into the boiler or boilers possibly becomes more pure while being boiled in the boiler or boilers and rises towards the upper portion thereof, from which the purer water is conducted into the combiner to aid in purifying the new feed-water. By reference to the description of the details of construction and functions of the various units or portions of the purifying system, the purpose and mode of operation thereof will be readily understood without further detailed description of the function of the several parts or features, it being obvious to the operator how the various valves mentioned are to be manipulated to obtain the required results in obtaining as nearly perfect feed-water for boilers as may be obtained from impure water, the importance and value of which are well known.

Having thus described the invention, what is claimed as new is:

1. A feed-water purifier including a settling-tank having an inlet connection, an outlet conduit connected to the settling-tank, a precipitating-tube connected with the inlet connection and having a combiner chamber connected therewith, the combiner chamber having an inlet neck, a controller tube extending into the combined chamber and nearly to the interior of the precipitating-tube, a feed-pipe connected with the controller tube, and means for variably controlling a stream flowing from the controller tube.

2. A feed-water purifier including a water-combiner comprising a hollow body having a discharge neck on one portion and a controller tube extending from another portion thereof and into the discharge neck, a feed-pipe connection on the controller tube, a hot-water pipe connection on the hollow body, and a controller device movably arranged in the discharge neck to cooperate with the end of the controller tube and provided with compensating means automatically operating to control the device in response to varying pressure and flow through the controller tube and into the discharge neck.

3. A feed-water purifier including a water-combiner comprising a hollow body having a narrow discharge neck on one portion and a controller tube extending from the opposite portion thereof and into the discharge neck, a hot-water pipe connection on the hollow body, a precipitating-tube having an inlet end and an outlet end, the inlet end being connected with the discharge neck of the hollow body, the precipitating-tube having guides therein, a conical controller device arranged in the discharge neck to operate with respect to the end of the controller tube and having a controlling stem extending into the precipitating-tube and through the guides therein, and means supported by the precipitating-tube and having connection with the controlling stem to automatically act to control the controller device.

4. A feed-water purifier including a combiner having an inlet neck on one portion and a flaring outlet neck on the opposite portion thereof, the combiner having also a side inlet, a controller tube secured in the inlet neck and extending into the outlet neck, a precipitating-tube having an inlet end and an outlet end and also guides between its ends adjacent thereto, the inlet end being connected to the outlet neck of the combiner, a heating coil arranged in the precipitating-tube between the guides therein and having a supply line connected therewith in proximity to the flaring outlet neck, the coil having a discharge line connected therewith in proximity to the outlet end of the precipitating-tube, a conical controller device arranged in the outlet neck of the combiner to co-operate with the end of the controller tube and having a controlling stem extending through the coil and the guides, and compensating means supported by the precipitating-tube and connected with the controlling stem.

5. A feed-water purifier including a combiner having a chamber provided with a side inlet and also a discharge neck, a controller tube extending into and partly through the chamber and past the side inlet and into the discharge neck, the end of the tube having a beveled inner edge, a feed-pipe connected with the controller tube, a conical controller device movably arranged opposite to the end of the controller tube to co-operate with said inner edge and having a controlling rod guided for longitudinal movement, and means connected with the controlling rod to yieldingly move the conical device to said inner edge.

6. A feed-water purifier including a circulation conduit having a combiner chamber and a precipitating-tube connected therewith to form portions thereof, the chamber having a discharge neck flaring to and connected with the precipitating-tube, a feed-pipe having a terminal end within the neck of the combiner chamber, a conical device arranged in said neck and guided by means of the precipitating-tube to be variably entered into the terminal end of the feed-pipe, and means having operative connection with the conical device and the precipitating-tube acting to automatically advance the device to close the terminal end and to yield responsive to increasing pressure from said end to permit increased flow.

7. A feed-water purifier including a settling-tank having an inlet elbow therein extending from the wall thereof and towards one end of the settling-tank, the end of the elbow having a pipe T thereon affording two outlets from the elbow, an outlet conduit connected to the settling-tank adjacent to the opposite end thereof, a precipitating-tube connected with the elbow and having a combiner chamber connected therewith, a controller tube extending into said chamber, a feed-pipe connected with the controller tube, and means for variably controlling a stream flowing from the controller tube.

8. A feed-water purifier including a water-combiner comprising a hollow body having a discharge end on one portion and a controller tube extending from the opposite portion thereof and into the discharge end, the end of the controlling-tube having a beveled inner edge, a feed-pipe connected with the controller tube, a hot-water pipe connected with the hollow body, and a conical device movably arranged in said discharge end opposite to the end of said tube and provided with compensating means automatically operating to move the device towards said beveled edge in response to decreasing pressure in the controller tube and permitting increased pressure and flow through the tube to move the device in the opposite direction.

9. In a feed-water purifier, a precipitating-tube comprising a cylindrical wall having a journal box on its lower portion, a rock-shaft mounted in said box and extending out from one side thereof, a lever arm secured to said rock-shaft and extending inward, two guides supported by said wall in the lower and upper portions of the precipitating-tube, a stem guided in said guides and connected with said arm, a combiner connected with the top of said wall and having a controller tube therein extending towards said stem, a conical device fixed on said stem to operate with respect to the end of the controller tube, a lever arm secured to the outer portion of the rock-shaft, and a weight adjustable on the last-described arm, in combination with a feed-pipe having connection with said controller tube, a circulation conduit connected with the combiner, and a circulation conduit having connection with the lower portion of said wall.

10. In a feed-water purifier, a combiner comprising a hollow body having a narrow lower portion and a discharge end flaring out from said narrow portion, said body having an inlet in the upper portion of its side, the upper portion of said body having a neck thereon, a controller tube having a collar thereon seated in said neck, the tube extending into said narrow portion and having a beveled inner edge in its end, a conical controller device having a controlling stem provided with a guide to guide the device relatively to said beveled edge, a lever pivotally supported between its ends and having one end connected with said stem, and a weight adjustable on the lever adjacent to its opposite end, in combination with a feed-pipe connected with the controller tube, a circulation conduit connected with said inlet, and a precipitating-tube connected with said discharge end to constitute a portion of the circulation conduit.

11. In a feed-water purifier, the combination with a steam-boiler having a water space and a steam space therein, of a combiner comprising a hollow body having a discharge neck on one portion and a controller tube extending from another portion thereof and into the discharge neck, a feed-pipe connected with the controller tube, a precipitating-tube connected with said neck, a feed-line having connection with the precipitating-tube and also with the lower portion of the boiler water space, the feed-line having a series of water-purifying means therein, a circulation pipe connected with the upper portion of the boiler water space and also with said hollow body and having two branches provided each with a stop-valve, means connected with the ends of said branches for forcing flow at will through the circulation pipe from the boiler water space, and a pipe connected with the boiler steam space and extending into the upper portion of the precipitating-tube and thence downward and outward therefrom.

In testimony whereof, I affix my signature in presence of two witnesses.

BUDD L. MORRISON.

Witnesses:
O. S. WHITEMAN,
E. T. SILVIUS.